US010943314B2

(12) United States Patent
Hildebrand

(10) Patent No.: US 10,943,314 B2
(45) Date of Patent: Mar. 9, 2021

(54) DETERMINING A CLOSEST ESTIMATED MARKET VALUE OF A REAL ESTATE PROPERTY

(71) Applicant: Patience and Fortitude, Inc., Los Angeles, CA (US)

(72) Inventor: Harold Hildebrand, Los Angeles, CA (US)

(73) Assignee: Patience and Fortitude, Inc., Palos Verdes Peninsula, CA (US)

( * ) Notice: Subject to any disclaimer, the term of this patent is extended or adjusted under 35 U.S.C. 154(b) by 232 days.

(21) Appl. No.: 15/666,921

(22) Filed: Aug. 2, 2017

(65) Prior Publication Data

US 2019/0043144 A1 Feb. 7, 2019

(51) Int. Cl.
*G06Q 30/02* (2012.01)
*G06Q 50/16* (2012.01)

(52) U.S. Cl.
CPC ......... *G06Q 50/16* (2013.01); *G06Q 30/0206* (2013.01)

(58) Field of Classification Search
None
See application file for complete search history.

(56) References Cited

U.S. PATENT DOCUMENTS

| 5,414,621 | A * | 5/1995 | Hough | G06Q 30/0205 |
| | | | | 705/38 |
| 2010/0023379 | A1* | 1/2010 | Rappaport | G06Q 30/02 |
| | | | | 705/7.34 |
| 2011/0196762 | A1* | 8/2011 | DuPont | G06Q 30/0278 |
| | | | | 705/27.1 |
| 2013/0166354 | A1* | 6/2013 | Hummel | G06Q 50/00 |
| | | | | 705/7.35 |
| 2016/0314425 | A1* | 10/2016 | Cunningham | G06Q 30/0278 |

OTHER PUBLICATIONS

"BPO's: The Agent's Role in the Valuation Process" (published in 2011 by the National Association of Realtors and available on http://courses.learninglibrary.com/TLLFlash/BPO/pdf/BPO_Valuation_Course_Student_Manual.pdf) (Year: 2011).*
"What is a Zestimate? Zillow's Zestimate Accuracy", Zillow [online], accessed on Oct. 12, 2017, from: https://www.zillow.com/zestimate/, 10 pages.

* cited by examiner

*Primary Examiner* — James M Detweiler
(74) *Attorney, Agent, or Firm* — Perkins Coie LLP

(57) ABSTRACT

The disclosure is directed to determining, among a number of estimated market values of a real estate property, an estimated market value (EMV) that is closest to an EMV computed by an application ("application-computed EMV"). The application receives a property profile from a user, e.g., a seller, having pictures and description of a real estate property, e.g., a house. The application publishes the property profile to multiple member agents, e.g., real estate agents, who can provide an EMV of the real estate property based on their opinion. The application determines the application-computed EMV based on a variety of property data, e.g., sales and/or tax history of the real estate property or other related real estate properties, obtained and/or derived from various third party systems. The application then compares the application-computed EMV with member agent-provided EMVs to determine a member agent-provided EMV that is closest to the application-computed EMV.

19 Claims, 6 Drawing Sheets

|   | Guesstimate : $405,000 | Closest EMV : $408,000 |
|---|---|---|
| 1 |  | $400,000 |
| 2 |  | $410,000 |
| 3 |  | $450,000 |
| 4 |  | $395,000 |
| 5 |  | $408,000 |

*FIG. 2*

DETERMINING A CLOSEST ESTIMATED MARKET VALUE OF A REAL ESTATE PROPERTY

BACKGROUND

A seller interesting in selling his/her house typically approaches a real estate agent to get a home appraisal or an estimated market value (EMV) of the house. Often times the seller obtains the EMV of the house from a number of real estate agents to ensure that he/she is obtaining an appropriate appraisal of the house. Sometimes the EMVs provided by the real estate agents can differ significantly. For example, the EMVs can differ by as much as thirty percent. Accordingly, there is no way for the seller to know how accurate the EMVs quoted by the real estate agents are and which of the EMVs is the most accurate.

Some websites provide an EMV for a real estate property. However, those websites do not have sufficient data to calculate the EMV accurately, and therefore, such an EMV can be way off the actual selling price of the real estate property. Some websites can determine the EMV as a range, which again may not be very helpful to the seller, especially if the range is significantly large.

BRIEF DESCRIPTION OF THE DRAWINGS

FIG. 2 is a block diagram of a graphical user interface (GUI) for presenting various EMVs of a real estate property to a user, consistent with various embodiments.

DETAILED DESCRIPTION

Figure 1:
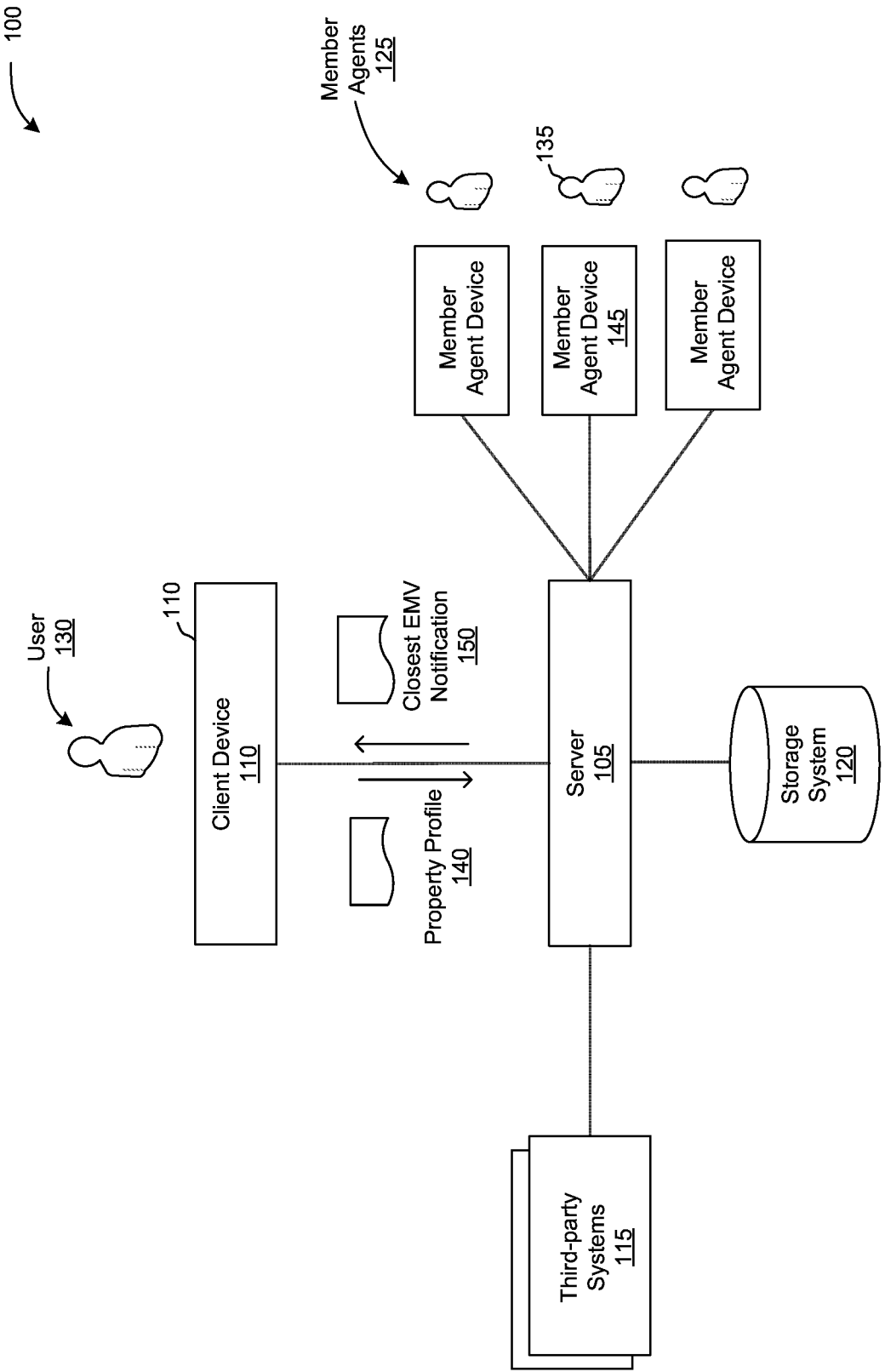
FIG. 1 is a block diagram illustrating an environment in which the disclosed embodiments can be implemented.

Embodiments are directed to a "guesstimate" application that determines, among a number of estimated market values of a real estate property, an estimated market value (EMV) that is closest to an EMV computed by the application ("application-computed EMV"). The guesstimate application can then provide information regarding an entity that provided the closest EMV, e.g., a real estate agent, to an entity associated with the real estate property, e.g., a seller. The seller can then contact the real estate agent for further information, e.g., for facilitating the sale of the real estate property.

The guesstimate application can have at least two types of users or consumers. A first type of consumer can be an entity, e.g., a seller or a buyer, who wants to obtain an EMV of a real estate property for buying or selling the real estate property. A second type of consumer can be members of the guesstimate application, such as real estate agents ("member agents"), who can provide an EMV for the real estate property based on their opinion. Note that while the users of the guesstimate application are not restricted to seller, buyer and member agents, for the sake of simplicity, henceforth, the first type of consumer is referred to as a "seller" and the second type of consumer is referred to as a "member agent."

The seller can upload information regarding their real estate property, e.g., a house, to the guesstimate application and generate a profile of the real estate property. For example, the seller can upload pictures of a house, and a description describing multiple attributes of the house, such as a number of bedrooms, type of flooring in various areas of the house, type of lighting, heating and cooling, upgrades to various areas of the house, backyard information, swimming pool information etc. The guesstimate application publishes the property profile to a number of member agents who can analyze the property profile and provide an EMV of the real estate property based on their opinion. The EMVs are stored at a data storage system associated with the guesstimate application. The guesstimate application can also determine or compute the EMV of the real estate property, e.g., the application-computed EMV. The guesstimate application can determine the application-computed EMV based on property evaluation data obtained from a number of third party systems and/or based on the property profile uploaded by the seller. The property evaluation data can include property tax record information, sales records of the real estate property, sales records of other real estate properties within a specified proximity of the real estate property, a lot size and a value of the lot at which the real estate property is built, information from member agents, etc.

After the guesstimate application computes the EMV, the application-computed EMV is compared with the member agent-provided EMVs to determine a particular member agent-provided EMV that is closest to the application-computed EMV. The guesstimate application can then notify the seller regarding the particular member agent-provided EMV and the particular member agent who provided that EMV. For example, the guesstimate application can present all the member agent-provided EMVs in a graphical user interface (GUI) on a client computing device ("client device") associated with the seller, and highlight the particular member agent-provided EMV that is closest to the application-computed EMV, such as generate the particular member agent-provided EMV in a color, font, background, a position in the GUI, etc., different from other EMVs.

Turning now to Figures, FIG. 1 is a block diagram illustrating an environment 100 in which the disclosed embodiments can be implemented. The environment 100 includes a server computing device ("server") 105 at which the guesstimate application can be implemented. A consumer of the guesstimate application, such as a seller 130, can access the guesstimate application using a client device 110. The guesstimate application can be implemented as a website and can be accessed using a software tool, such as a web browser, at the client device 110. In some embodiments, the guestimate application can be implemented as an app, which can be downloaded from the server 105 and installed at the client device 110. In an event the guesstimate application is implemented as an app, a portion of the guesstimate application can be executing at the client device 110 and another portion at the server 105.

The environment 100 includes multiple third party systems 115 that provide property data for various real estate properties. Some third party systems 115 can provide an interface to a multiple listing service (MLS), which contains a list of homes for sale in different geographical locations.

The MLS listing can contain photos of a real estate property, a selling price, characteristics or attributes, address and any noteworthy items.

Some third party systems 115 can provide sale history of real estate properties, real estate properties within a specified geographical location, real estate properties within a specified distance from a specified location or a specified real estate property, real estate properties sold recently within a specified period (such as last 3 months from the date the application-computed EMV is generated), etc. The sale history can include the EMVs, which can be quoted by member agents 125 or others, and the actual sale prices of the real estate properties.

Some third party systems 115 can provide tax history of real estate properties, real estate properties within a specified geographical location, real estate properties within a specified distance from a specified location or a specified real estate property, real estate properties sold recently within a specified period, etc. The tax history can include information regarding the taxes assessed and/or taxes paid for the real estate properties.

Some third party systems 115 can provide lot details of real estate properties, which can include a size of a lot at which a real estate property is built and a value of the lot.

Some third party systems 115 can provide data regarding an EMV of a particular characteristic or an attribute of a real estate property. For example, the data can include an EMV of a bedroom, a hardwood floor, a carpet floor, a marble countertop, a granite counter top, a backyard of a specific size, a swimming pool, recessed lighting, air conditioning, heating, type of appliances, age of appliances, year of construction, etc. In some embodiments, some of the property data can be input by the member agents 125.

The server 105 can use the property data from the third party systems 115 as property evaluation data in determining an EMV of a real estate property. In some embodiments, the third party system 115 may not have the necessary property data or may have the property data in a different format from what is required by the server 105 in determining the EMV. The server 105 can analyze the property data available in the third party systems 115 and derive the property evaluation data from the analysis and uses the derived property evaluation data in determining the EMV of a real estate property. For example, the third party systems 115 may not have an EMV of a swimming pool in a real estate property in a particular geographic location. The server 105 can analyze the property data of real estate properties in the particular geographic location obtained from the third party systems 115, identify at least two real estate properties that have been recently sold, in which one has a swimming pool and another does not have a swimming pool, and then compute the EMV of a swimming pool based on the actual sale prices of the at least two real estate properties while accounting for any differences in attributes of the two real estate properties.

The server 105 can also monitor various electronic resources in the third party systems 115, e.g., journals, articles, blogs, websites, to identify any content or discussion regarding real estate properties and extract or derive any information from the content that can be used as part of the property evaluation data in determining an EMV of a real estate property. In some embodiments, the server 105 can implement artificial intelligence (AI), machine learning (ML), and/or natural language processing (NLP) techniques in obtaining or deriving the property evaluation data from the third party systems 115. The server 105 can store the property evaluation data in the storage system 120.

The server 105 can also obtain property data from the member agents 125. The member agents 125 can be any entity, such as real estate brokers or agents, that can provide an EMV for a real estate property and/or any information regarding real estate properties. The member agents 125 can gain access to the guesstimate application at the server 105 by signing up and/or becoming members of the guesstimate application. A member agent can create an agent profile after becoming a member of the guesstimate application. The agent profile can have information regarding a member agent, such as a name of the agent; a telephone number, an email address, a physical address, a social networking identification and/or other contact information of the agent; a photograph of the agent; recent sale history of the agent; and any accolades or recognition bestowed upon the agent. In some embodiments, the guesstimate application can also assign a score to the agent, which can be based on (a) a history of accuracy of EMVs provided by the agent, which is indicative of the number of closest EMVs (closest to the application-computed EMVs for the corresponding real estate properties) provided by the agent, or (b) a success rate of the agent, which is indicative of a number real estate properties sold at or near (e.g., within a specified threshold) the EMV provided by the agent, and other such factors.

A member agent can interact with the guesstimate application using a member agent device. The member agent device can provide access to the guesstimate application via an app installed at the member agent device and/or via a web browser, which can receive a webpage associated with the guesstimate application from the server 105 and generate the webpage on the member agent device. A member agent device can be any computing device that is capable of providing access to the guesstimate application executing at the server 105, e.g., a desktop, a laptop, a tablet, a mobile phone, a smartphone, and/or a wearable device.

Users, e.g., a buyer and/or seller, can also sign up with the guesstimate application and create a user profile. The user profile can have information regarding the user, such as a name of the user; a telephone number, an email address, a physical address, and/or other contact information of the agent; and one or more property profiles, which includes information regarding one or more real estate properties for which the user is interested in obtaining the EMV. The seller 130 can access the guesstimate application using the client device 110, e.g., in a way similar to that of the member agents 125. The client device 110 can be any computing device that is capable of providing access to the guesstimate application executing at the server 105, e.g., a desktop, a laptop, a tablet, a mobile phone, a smartphone, and/or a wearable device.

To obtain an EMV for a real estate property, the seller 130 can input the property profile 140, which includes information regarding the real estate property, to the guesstimate application. The property profile can include one or more images of the real estate property representing various aspects of the real estate property, and a description that describes various attributes of the property, e.g., lot size, a number of rooms, a type of lighting, a type of flooring, a type of heating and/or air conditioning, type of appliances, whether the property has a swimming pool, year of constructions, taxes assessed and paid, etc.

The guesstimate application publishes the property profile 140 to the member agents 125. All or some of the member agents 125 can review the property profile 140 and provide an EMV of the real estate property, e.g., based on their opinion. In some embodiments, the guesstimate application receives the EMVs from at least two of the member agents 125. The server 105 stores the member agent-provided EMVs in the storage system 120.

The guesstimate application also computes the EMV of the real estate property based on various factors, e.g., the property profile 140 and the property evaluation data obtained or derived from the third party systems 115. For example, the guesstimate application considers the description of the multiple attributes of the real estate property provided by the seller 130 in the property profile 140 for determining the EMV. The guesstimate application also considers the sale history and/or tax history of the real estate property and/or similar real estate properties that are recently sold within the proximity of the real estate property, real estate properties within a specified distance from a specified location or a specified real estate property. Additional details with reference to determining the application-computed EMV for the real estate property are described at least with reference to FIG. 5 below.

After generating the application-computed EMV, the guesstimate application compares the application-computed EMV with the member agent-provided EMVs to determine a specified member agent-provided EMV that is closest to the application-computed EMV. In some embodiments, the closest member agent-provided EMV is that member agent-provided EMV which has the least difference with the application-computed EMV. The guesstimate application can generate a notification 150 to notify the seller 130 regarding the specified member agent-provided EMV and a specified member agent, e.g., specified member agent 135, who provided the closest EMV for the real estate property. The notification 150 can take various forms and have a variety of information. For example, the notification 150 can be an email notification having the specified member agent-provided EMV and contact information of the specified member agent 135. In another example, the notification 150 can be a text message having the specified member agent-provided EMV and contact information of the specified member agent 135. In another example, the notification 150 can be a text message having a link, which when selected, a GUI having the specified member agent-provided EMV and contact information of the specified member agent 135 is generated at the client device 110. In another example, the notification 150 can be an in-app notification, which when selected, a GUI having the specified member agent-provided EMV and contact information of the specified member agent 135 is generated at the client device 110. In still another example, the guesstimate application can directly generate a GUI, regardless of sending the notification 150, on the client device 110 displaying all member agent-provided EMVs, the application-computed EMV and the specified member agent-provided EMV that is closest to the application-computed EMV, and contact information of the specified member agent 135.

Further, in some embodiments, the notification can also include a recommendation to the user to contact one or more of the member agents, who can be selected based on their associated scores.

FIG. 2 is a block diagram of a GUI for presenting various EMVs of a real estate property to a user, consistent with various embodiments. The GUI 200 is generated by the guesstimate application of FIG. 1. The guesstimate application can generate the GUI 200 as a webpage or in the guesstimate application app at the client device 110. The GUI 200 displays the member-agent provided EMVs 210 for the real estate property and member agent-information 205 of the member agents that provided the EMVs 210. The member agents displayed in the member agent-information 205 can be similar to the member agents 125 of FIG. 1 or at least a subset of the member agents 125.

The GUI 200 also displays the application-computed EMV 215, and the member-agent provided EMV 220 that is closest to the application-computed EMV 215. The GUI 200 can highlight the closest member-agent provided EMV 220 to be prominent and/or distinct from other member-agent provided EMVs 210. For example, the GUI 200 can display the closest member-agent provided EMV 220 in a section of the GUI 200 separate from the member-agent provided EMVs 210, e.g., next to the application-computed EMV 215 as illustrated in the GUI 200. In another example, the GUI 200 can highlight a row of the table in which the closest member-agent provided EMV is presented, e.g., present the closest member-agent provided EMV in a font, color, style or format different from the other member-agent provided EMVs 210.

Further, the GUI 200 can also present member-agent information 225 having contact information of the member agent who provided the closest member-agent provided EMV 220.

The guesstimate application can customize the content of the GUI 200 to be presented based on roles and/or access permissions. While the guesstimate application presents all member-agent provided EMVs 210 member agent-information 205 of those member agents and the application-computed EMV 215 in the GUI 200 to the seller 130, the guesstimate application may not present all the information to the member agents. In some embodiments, the guesstimate application does not make the GUI 200 accessible by any of the member agents, e.g., in order to keep a member agent from knowing EMVs quoted by the other member agents. In some embodiments, a member agent can view in the GUI 200 all the member-agent provided EMVs 210 but not the member agent-information 205 of member agents who quoted those EMVs.

Figure 3:
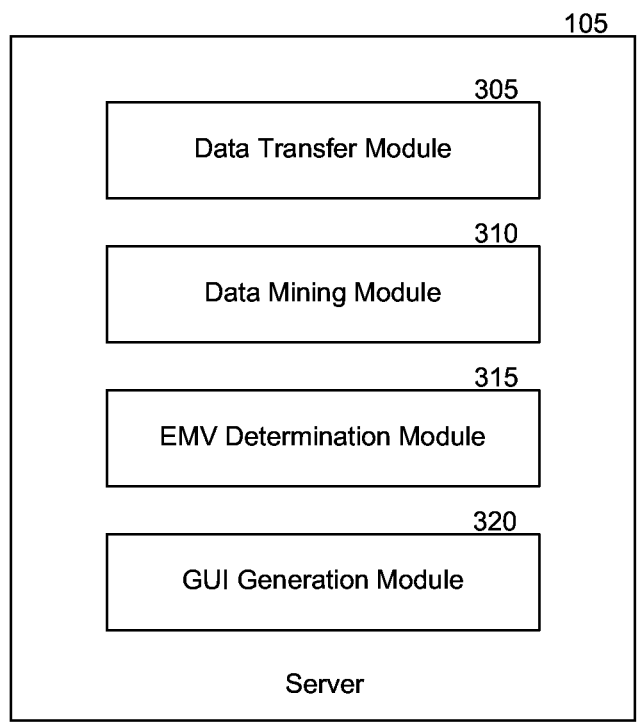
FIG. 3 is a block diagram of a server of FIG. 1 using which a guesstimate application can be implemented, consistent with various embodiments.

FIG. 3 is a block diagram of a server of FIG. 1 using which the guesstimate application can be implemented, consistent with various embodiments. The server 105 includes a data transfer module 305 that can receive input data or send output data to the seller 130 and/or the member agents 125. For example, the data transfer module 305 can receive the property profile 140 from the seller 130. In another example, the data transfer module 305 can also receive member-agent provided EMVs from the member agents.

The server 105 includes a data mining module 310 that can obtain property data of real estate properties from the third party systems 115, which can be used as property evaluation data in determining an EMV for a real estate property.

The server 105 includes an EMV determination module 315 that can determine the application-computed EMV for a real estate property, e.g., based on the property profile and the property evaluation data. In some embodiments, the EMV determination module 315 can derive the property evaluation data from the property data obtained by the data mining module and use the derived property evaluation data in addition to or instead of the property evaluation data obtained from the third party systems 115 in generating the application-computed EMV.

The server 105 includes a GUI generation module 320 that can render a GUI, e.g., GUI 200, to present the application-computed EMV, member-agent provided EMVs and member agent information of those member agents from whom the EMVs were received. Additional details with respect to the above modules are discussed with at least reference to FIGS. 4 and 5 below.

Figure 4:
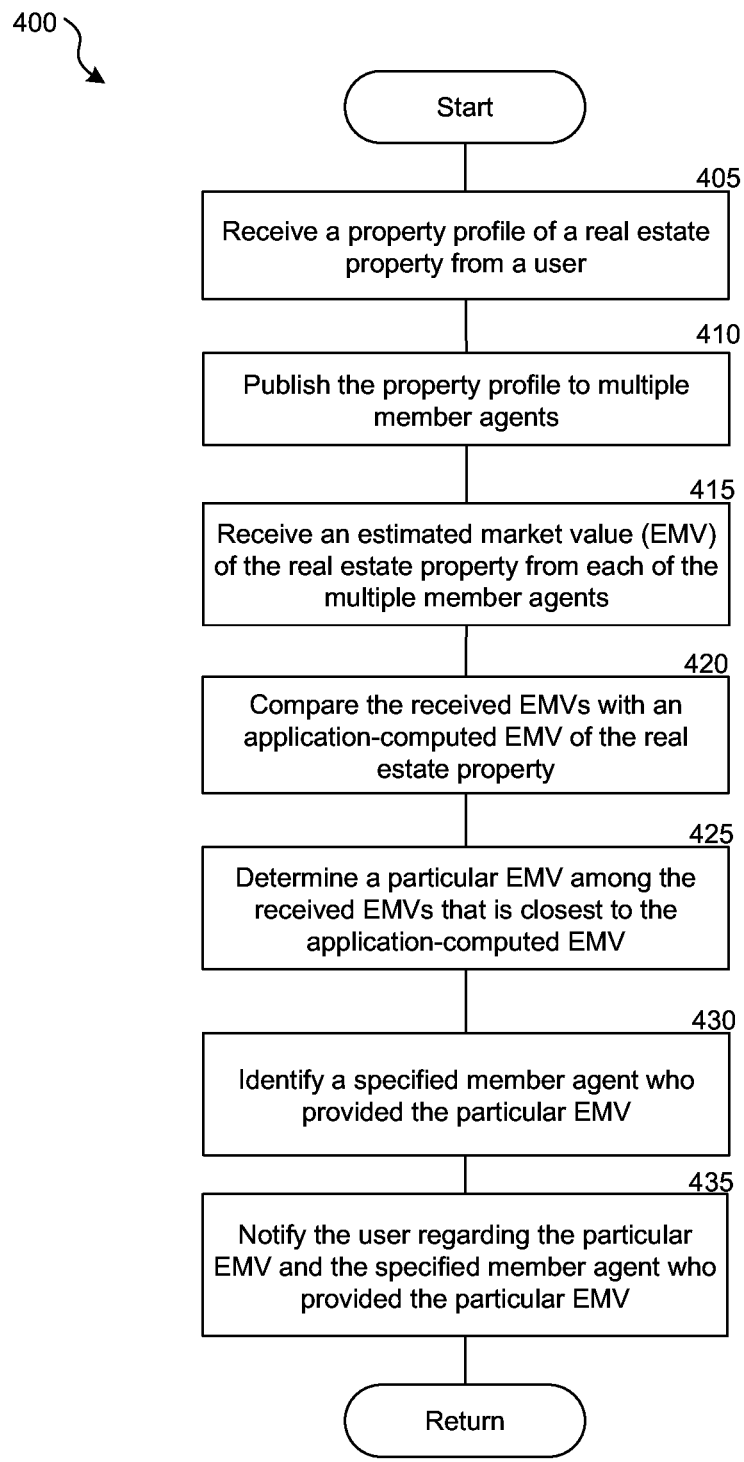
FIG. 4 is a flow diagram of a process for determining a closest member agent-provided EMV of a real estate property, consistent with various embodiments.

FIG. 4 is a flow diagram of a process 400 for determining a closest member-agent-provided EMV of a real estate property, consistent with various embodiments. The process 400 may be executed in the environment 100 of FIG. 1. At block 405, the data transfer module 305 receives a property profile 140 of a real estate property from the seller 130, e.g., as described at least with reference to FIG. 1. The property profile 140 can include one or more pictures of the real estate property representing various aspects of the real estate property, and a description that describes various attributes of the property, e.g., lot size, a number of rooms, a type of lighting, a type of flooring, a type of heating and/or air conditioning, type of appliances, whether the property has a swimming pool, year of constructions, taxes assessed and paid, etc.

At block 410, the data transfer module 305 publishes the property profile to the member agents 125 of the guesstimate application.

At block 415, the data transfer module 305 receives an EMV of the real estate property from the member agents 125. The member agents 125 can analyze the property profile and provide an EMV for the real estate property, e.g., based on their opinion. Some or all of the member agents 125 can provide the EMVs. In some embodiments, at least two of the member agents 125 provide the EMV.

At block 420, the EMV determination module 315 compares the member agent-provided EMVs with the application-computed EMV of the real estate property. In some embodiments, the application-computed EMV is determined by the EMV determination module 315 based on property evaluation data that is obtained and/or derived from the third party systems 115. Additional details with respect to the generating the application-computed EMV is described at least with reference to FIG. 5 below.

At block 425, the EMV determination module 315 determines a member agent-provided EMV that is closest to the application-computed EMV. In some embodiments, the closest member agent-provided EMV is that member agent-provided EMV which has the least difference with the application-computed EMV.

At block 430, the EMV determination module 315 determines a specified member agent who provided the closest member agent-provided EMV.

At block 435, the GUI generation module 320 generates a notification 150 to notify the seller 130 regarding the closest member agent-provided EMV and a specified member agent, e.g., the specified member agent 135, who provided the closest EMV for the real estate property. The notification 150 can take various forms and have a variety of information, e.g., as described at least with reference to FIGS. 1 and 2. For example, the guesstimate application can generate the GUI 200 on the client device 110 displaying all member agent-provided EMVs, the application-computed EMV, the specified member agent-provided EMV that is closest to the application-computed EMV.

Figure 5:
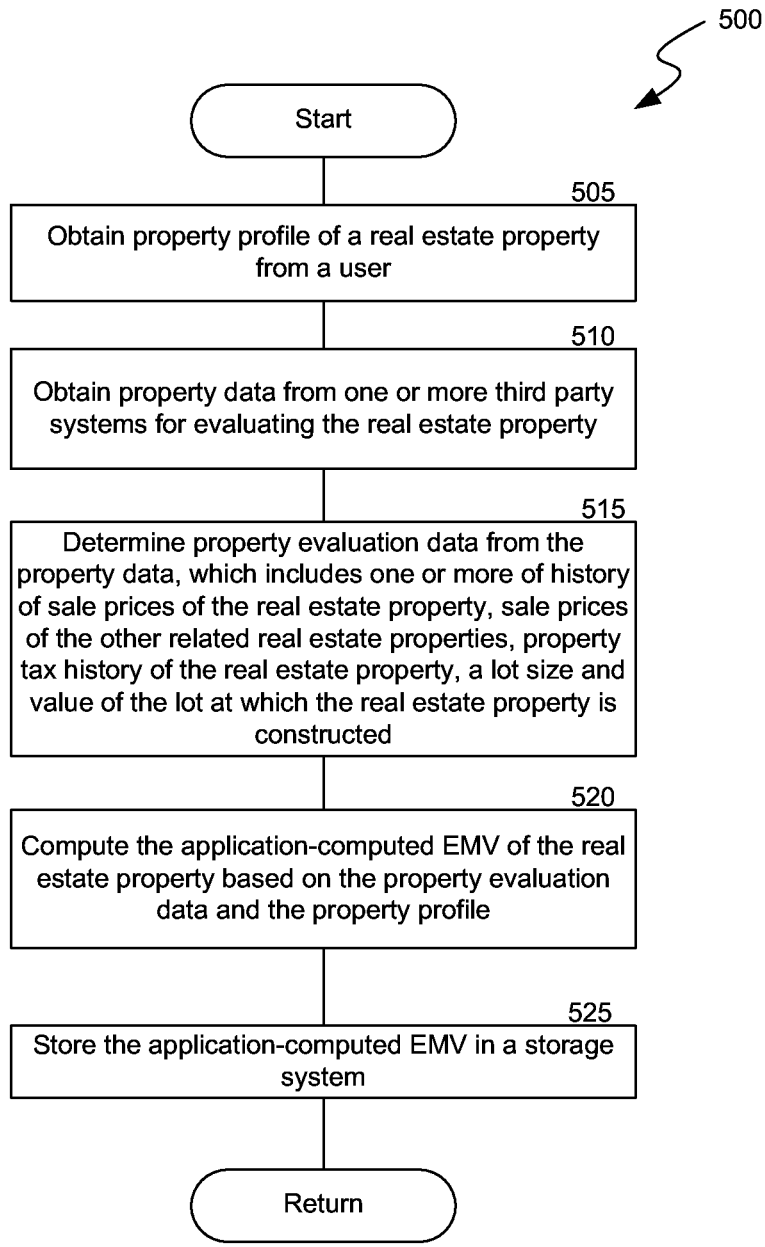
FIG. 5 is a flow diagram of a process for determining an application-computed EMV of a real estate property, consistent with various embodiments.

FIG. 5 is a flow diagram of a process 500 for determining an EMV of a real estate property, consistent with various embodiments. The process 500 may be executed in the environment 100 of FIG. 1. At block 505, the data transfer module 305 obtains the property profile 140 of a specified real estate property from the seller 130. The property profile 140 can include one or more pictures of the specified real estate property representing various aspects of the real estate property, and a description that describes various attributes of the specified real estate property, e.g., lot size, a number of rooms, a type of lighting, a type of flooring, a type of heating and/or air conditioning, type of appliances, whether the property has a swimming pool, year of constructions, taxes assessed and paid, etc.

At block 510, the data transfer module 305 obtains property data of the specified real estate property or of real estate properties related to the specified real estate property from the third party systems 115 that can be used as property evaluation data in determining the application-computed EMV of the specified real estate property. The property data can include sale history and/or tax history of the real estate property and/or of other real estate properties related to the real estate property. The property data can include lot details of real estate properties, such as a size of a lot at which a real estate property is built and a value of the lot. The property data can include information regarding an EMV of a particular characteristic or an attribute of a real estate property. For example, the data can include an EMV of a bedroom, a hardwood floor, a carpet floor, a marble countertop, a granite counter top, a backyard of a specific size, a swimming pool, recessed lighting, air conditioning, heating, type of appliances, age of appliances, year of construction, etc.

In some embodiments, the real estate properties related to the specified real estate property can include those real estate properties that are in or within a specified proximity of a geographical location the specified real estate property is located at. In some embodiments, in considering property data of the related real estate properties, the guesstimate application can consider those related real estate properties that were sold recently within a specified period, e.g., within the last 30 days, 3 months, 6 months, 1 year from the date the application-computed EMV is generated from the specified real estate property. A geographic location of the specified real estate property can be any of a community within which the specified real estate property is located, a street, a neighborhood, a zip code, etc. A real estate property is considered to be within the proximity of the specified real estate property if the real estate property is within the same community, street, block, neighborhood, zip code, as that of the specified real estate property or within a specified distance from the specified real estate property.

At block 515, the EMV determination module 315 determines the property evaluation data from the obtained property data. In some embodiments, the property data obtained from the third party systems 115 can be in a format different from what is required by the guesstimate application for determining the application-computed EMV. The EMV determination module 315 can convert the property data obtained from the third party systems 115 in a format that is required by the guesstimate application. For example, some third party systems 115 may not specify a certain aspect of a real estate property as an attribute of the real estate property; however, the third party system 115 can include some user discussions or other content discussing certain aspects of the real estate property. The EMV determination module 315 can analyze the content from the third party systems 115, identify the aspect as an attribute of the real estate property and use the attribute in determination of the application-computed EMV.

In some embodiments, the property data obtained from the third party systems may not have the EMV of a particular attribute, e.g., a swimming pool. However, if the specified real estate property has a swimming pool, the guesstimate application may want to consider the EMV of a swimming pool in order for the application-computed EMV to be more accurate. The EMV determination module 315 can analyze the property data available from the third party systems 115 and derive the property evaluation data, e.g., the EMV of a particular attribute, from the analysis and use the derived property evaluation data in determining the application-computed EMV of a real estate property. For example, the EMV determination module 315 can analyze the property data of real estate properties in the particular geographic location obtained from the third party systems 115, identify at least two real estate properties that have been recently sold, in which one has a swimming pool and another does not have a swimming pool, and then compute the EMV of a swimming pool based on the actual sale prices of the at least two real estate properties while accounting for any differences in attributes of the two real estate properties. In some embodiments, the EMV determination module 315 can assign different weights to different attributes of the real estate property and determine the EMV of an attribute based on its corresponding weight.

In some embodiments, if the EMV determination module 315 determines that if the amount of the property evaluation data obtained from the third party systems 115 is below a specified threshold, e.g., not sufficient to determine the application-computed EMV with a specified level of accuracy, the EMV determination module 315 can indicate the data mining module 310 to increase a search radius of the related real estate properties in the third party systems to find more property data. For example, in the search criterion for finding property data of related real estate properties, the data mining module 310 can increase the proximity criterion, such as from one mile to two miles within the specified real estate property, increase the sold within date range, adjust the attribute criterion to be broader by removing some attributes of a real estate property.

At block 520, the EMV determination module 315 determines the application-computed EMV based on the property evaluation data, e.g., determined in block 515, and the property profile 140. For example, the EMV determination module 315 determines the application-computed EMV based at least on the sales history, such as actual selling price, of the specified real estate property and/or the related real estate properties. In another example, the EMV determination module 315 determines the application-computed EMV based at least on the tax history of the specified real estate property and/or the related real estate properties. In another example, the EMV determination module 315 determines the application-computed EMV based at least on the geographical location at which the specified real estate property is located, the size of the lot and the cost per unit of the lot at which the specified real estate property is constructed.

In some embodiments, the EMV determination module 315 adjusts the application-computed EMV based on the member agent-provided EMV of a particular member agent whose number of real estate property evaluations having closest EMVs to the application-computed estimated market value for a corresponding real estate property exceeds a specified threshold.

At block 525, the EMV determination module 315 stores the application-computed EMV in the storage system 120.

Figure 6:
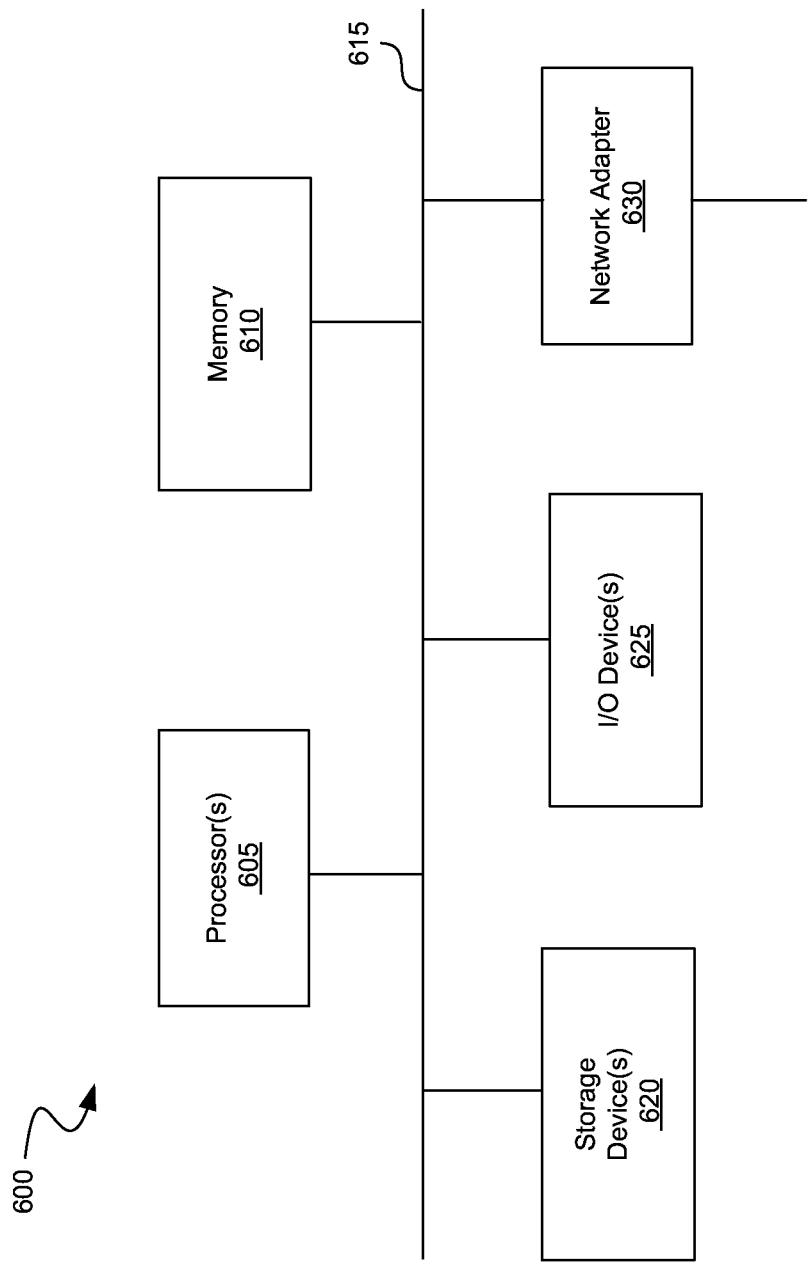
FIG. 6 is a block diagram of a computer system as may be used to implement features of the disclosed embodiments.

FIG. 6 is a block diagram of a computer system as may be used to implement features of the disclosed embodiments. The computing system 600 may be used to implement any of the entities, components, modules, systems, or services depicted in the examples of the foregoing figures (and any other entities described in this specification). The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media).

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A computer-implemented method, comprising:
   receiving, at an application executing on a computing system and from a user, a property profile of a property associated with the user, the property profile including (a) multiple images of multiple portions of the property and (b) descriptive data describing multiple attributes of the property;
   publishing, by the computing system, the property profile to multiple member agents of the application;
   receiving, at the computing system and based on the property profile, a series of market value estimates of the property from each of the multiple member agents;
   obtaining, by the computing system, property evaluation data from one or more third party systems, the property evaluation data including property characteristics of at least one comparable property related to the property, wherein the property evaluation data is in a first format, the first format being different from a second format required by the application;
   converting, by the computing system, the property evaluation data from the first format to the second format required by the application;
   generating, by the computing system, an application-computed estimated market value based on the property evaluation data, including:
      inspecting the property evaluation data to identify at least one comparable property that is within a threshold proximity to a location of the property and includes a threshold number of similar characteristics to the property;
      comparing the property evaluation data of the comparable property with the property profile of the property associated with the user to identify a series of differing characteristics between the comparable property and the property associated with the user;
      for each differing characteristic of the series of differing characteristics, identifying a characteristic value of the differing characteristic representing a value that the differing characteristic modifies the market value estimate of the property based on the obtained property evaluation data from the one or more third party systems; and
      for each differing characteristic of the series of differing characteristics, modifying a value of the comparable property using the characteristic value of the differing characteristic to derive the application-computed estimated market value;
   determining, at the computing system, a specified estimated market value based on at least one of the received market value estimates that is closest to the application-computed estimated market value of the property;
   generating, by the computing system, a webpage to present the application computed estimated market value and the specified estimated market value and information regarding a specified member agent of the member agents that provided the specified market value estimate while also including at least a portion of the series of market value estimates of the property from each of the multiple member agents;
   generating, by the computing system, a notification, the notification including a text message having a link, the link being operable to generate the webpage on a client computing device associated with the user; and
   sending, by the computing system, the notification to a client computing device associated with the user link.

2. The computer-implemented method of claim 1, wherein generating the application-computed estimated market value includes:
   determining, by the computing system and from the property evaluation data, a geographical location of a land parcel on which the property is located, a size of the land parcel and cost per unit of the land parcel, and
   determining, by the computing system, the application-computed estimated market value based on the geographical location, the size and the cost per unit.

3. The computer-implemented method of claim 1, wherein generating the application-computed estimated market value includes:
   determining, by the computing system and from the property evaluation data, tax information of the property, the tax information including a history of property taxes assessed and/or paid for the property, and
   determining, by the computing system, the application-computed estimated market value based on the tax information.

4. The computer-implemented method of claim 1, wherein generating the application-computed estimated market value includes:
   determining, by the computing system and from the property evaluation data, sales transaction history of the property, the sales transaction history including information regarding actual sale prices of the property in previous sale transactions, and determining, by the computing system, the application-computed estimated market value based on the sales transaction history.

5. The computer-implemented method of claim 4, wherein determining the sales transaction history includes determining those sales transactions that are conducted within a specified period from a specified date.

6. The computer-implemented method of claim 1, wherein generating the application-computed estimated market value includes:
   determining, by the computing system and from the property evaluation data, those properties that are within a proximity of the property as the set of properties related to the property, the proximity being within a first specified distance from the property,
   determining, by the computing system and from the property evaluation data, actual sale prices of the set of properties, and
   determining, by the computing system, the application-computed estimated market value based on the actual sale prices.

7. The computer-implemented method of claim 6, wherein determining the actual sale prices of the set of properties includes:
   identifying, by the computing system and from the property evaluation data, a subset of properties that has one or more attributes matching that of the property, wherein the one or more attributes include at least one of a lot size of the property, year of construction of the property, a number of rooms in the property, or interior upgrades to the property, and
   determining, by the computing system, the application-computed estimated market value based on actual sale prices of the subset of properties.

8. The computer-implemented method of claim 6, wherein determining the actual sale prices of the set of properties includes:
   determining, by the computing system and from the property evaluation data, that a number of records having actual sale prices of the set of properties is below a specified threshold,
   adjusting the proximity to a second specified distance that is greater than the first specified distance to generate an adjusted proximity,
   retrieving, by the computing system, records of actual sale prices of a subset of properties within the adjusted proximity, and
   determining, by the computing system, the application-computed estimated market value based on actual sale prices of the subset of properties.

9. The computer-implemented method of claim 6, wherein determining the actual sale prices of the set of properties includes determining the actual sale prices of those properties that are sold within a specified period from a specified date.

10. The computer-implemented method of claim 1, wherein generating the application-computed estimated market value includes:
    determining, by the computing system and from the property evaluation data, (a) an actual sale price of the property in a prior sales transaction, and (b) actual sale prices of the set of properties within a proximity of the property, and
    determining, by the computing system, the application-computed estimated market value based on the actual sale price of the property and the actual sale prices of the set of properties.

11. The computer-implemented method of claim 1, wherein generating the application-computed estimated market value includes:
    determining the application-computed estimated market value based on a value associated with the multiple attributes.

12. The computer-implemented method of claim 11, wherein generating the application-computed estimated market value includes:
    assigning a weight to each of the multiple attributes, wherein different attributes are associated with different weights, and
    determining the application-computed estimated market value based on the weights of the multiple attributes.

13. The computer-implemented method of claim 1, wherein generating the application-computed estimated market value includes:
    determining, by the computing system and from the property evaluation data, a set of estimated market values of the set of properties sold within a proximity of the property, the set of estimated market values received from one or more of the multiple member agents, and
    adjusting, by the computing system, the application-computed estimated market value based on the set of estimated market values.

14. The computer-implemented method of claim 13, wherein adjusting the application-computed estimated market value includes:
    determining, from the property evaluation data and for each of the member agents, a number of property evaluations in which an estimated market value of the corresponding property is closest to the application-computed estimated market value for the corresponding property,
    determining, by the computing system, a particular member agent of the member agents whose number of property evaluations exceeds a specified threshold, and
    adjusting, by the computing system, the application-computed estimated market value based on estimated market values of the particular member agent.

15. The computer-implemented method of claim 1, wherein receiving the estimated market values includes:
    generating, by the computing system on the client computing device associated with the user, a graphical user interface (GUI) to present the estimated market values and information regarding the corresponding member agents.

16. The computer-implemented method of claim 1 further comprising:
    generating, by the computing system on the client computing device associated with the user, a recommendation to the user to contact one or more of the member agents, wherein the one or more of member agents are selected based on at least one of (a) a history of accuracy of estimated market values provided by a particular member agent for properties, wherein the accuracy is determined based on a comparison to application-computed estimated market values of the properties, or (b) a success rate of the particular member agent, which is indicative of a number properties sold at an estimated market value provided by the particular member agent.

17. A non-transitory computer-readable storage medium storing computer-readable instructions, comprising:
    instructions for receiving, at an application executing on a computing system and from a user, a property profile of a property associated with the user, the property profile including (a) multiple images of multiple portions of the property and (b) descriptive data describing multiple attributes of the property;

instructions for publishing the property profile to multiple member agents of the application;

instructions for receiving an estimated market value of the property from each of the multiple member agents;

instructions for obtaining property evaluation data from one or more third party systems, the property evaluation data including property characteristics of a set of properties related to the property, wherein the property evaluation data is in a first format, the first format being different from a second format required by the application: instructions for converting, by the computing system, the property evaluation data from the first format to the second format required by the application;

instructions for determining an application-computed estimated market value of the property, including:

instructions for inspecting the property evaluation data to identify at least one comparable property that is within a threshold proximity to a location of the property and includes a threshold number of similar characteristics to the property;

instructions for comparing the property evaluation data of the comparable property with the property profile of the property associated with the user to identify a series of differing characteristics between the comparable property and the property associated with the user; for each differing characteristic of the series of differing characteristics, instructions for identifying a characteristic value of the differing characteristic representing a value that the differing characteristic provides to the market value estimate of the property based on the obtained property evaluation data from the one or more third party systems; and for each differing characteristic of the series of differing characteristics, instructions for modifying a value of the comparable property using the characteristic value of the differing characteristic to derive the application-computed estimated market value;

instructions for determining a specified estimated market value of the estimated market values based on at least one of the estimated market values received from the multiple member agents that is closest to the application-computed estimated market value;

instructions for generating a webpage to present the application computed estimated market value and the specified estimated market value and information regarding a specified member agent of the member agents that provided the specified market value estimate while also including at least a portion of the series of market value estimates of the property from each of the multiple member agents;

instructions for generating a notification, the notification including a text message having a link, the link being operable to generate the webpage on a client computing device associated with the user; and instructions for sending the notification to a client computing device associated with the user.

18. The non-transitory computer-readable storage medium of claim 17, wherein the instructions for determining the application-computed estimated market value of the property include:

instructions for determining, from the property evaluation data, those properties that (a) are within a specified proximity from the property, (b) have one or more attributes matching that of the property, and (c) sold within a specified period from a specified date as the set of properties related to the property.

19. A system, comprising:

a processor;

a first component configured to receive, at an application executing on a computing system and from a user, a property profile of a property associated with the user, the property profile including (a) multiple images of multiple portions of the property and (b) descriptive data describing multiple attributes of the property;

a second component configured to:

publish the property profile to multiple member agents, and receive an estimated market value of the property from each of the multiple member agents;

obtain property evaluation data from one or more third party systems, the property evaluation data including property data of at least one of the property or a set of properties related to the property, wherein the property evaluation data is in a first format, the first format being different from a second format required by the application;

convert, by the computing system, the property evaluation data from the first format to the second format required by the application; and generate an application-computed estimated market value based on the property evaluation data including:

inspecting the property evaluation data to identify at least one comparable property that is within a threshold proximity to a location of the property and includes a threshold number of similar characteristics to the property;

comparing the property evaluation data of the comparable property with the property profile of the property associated with the user to identify a series of differing characteristics between the comparable property and the property associated with the user;

for each differing characteristic of the series of differing characteristics, identifying a characteristic value of the differing characteristic representing a value that the differing characteristic provides to the market value estimate of the property based on the obtained property evaluation data from the one or more third party systems; and for each differing characteristic of the series of differing characteristics, modifying a value of the comparable property using the characteristic value of the differing characteristic to derive the application-computed estimated market value;

a third component configured to:

determine a specified estimated market value based on at least one of the estimated market values that is closest to the application-computed estimated market value of the property; and generate a webpage to present the application computed estimated market value and the specified estimated market value and information regarding a specified member agent of the member agents that provided the specified market value estimate while also including at least a portion of the series of market value estimates of the property from each of the multiple member agents;

generate a notification, the notification including a text message having a link, the link being operable to generate the webpage on a client computing device associated with the user; and a fourth component configured to send the notification to a client computing device associated with the user.

\* \* \* \* \*